350-331 SR
1/29/80 XR 4,186,395

United States Patent [19] [11] 4,186,395
Fujita et al. [45] Jan. 29, 1980

[54] METHOD OF DRIVING A LIQUID CRYSTAL DISPLAY APPARATUS

[75] Inventors: Masanori Fujita, Matsudo; Hajime Oda, Sakura, both of Japan

[73] Assignee: Kabushiki Kaisha Seikosha, Japan

[21] Appl. No.: 773,307

[22] Filed: Mar. 1, 1977

[51] Int. Cl.[2] .......... G09F 9/32; G06F 3/14

[52] U.S. Cl. .......... 340/765; 340/756; 340/805; 350/331

[58] Field of Search .......... 340/336, 324 M, 756, 340/765, 805; 350/160 LC, 330–332

[56] References Cited

U.S. PATENT DOCUMENTS

| | | | |
|---|---|---|---|
| 3,918,041 | 11/1975 | Mao | 340/336 |
| 3,981,004 | 9/1976 | Shimizu et al. | 340/336 |
| 3,995,942 | 12/1976 | Kawakami et al. | 340/336 |
| 4,019,178 | 4/1977 | Hashimoto et al. | 340/336 |
| 4,048,633 | 9/1977 | Sano | 340/336 |

*Primary Examiner*—Marshall M. Curtis
*Attorney, Agent, or Firm*—Robert E. Burns; Emmanuel J. Lobato; Bruce L. Adams

[57] ABSTRACT

A pulse applying method comprising applying a pulse train having a constant period to any one of a selection electrode and a control electrode which are opposed each other through a liquid crystal, while applying to the other a pulse train having a specific phase relationship with the said pulse train, whereby setting the total application time per unit period of the pulse applied between the selection electrode and the control electrode to two states, one being of the case where the liquid crystal operates and the other of the case where the liquid crystal does not operate, thus making the liquid crystal display unit indicative and non-indicative. A clear display with uniform contrast is obtainable. Moreover, a low-voltage drive is possible and the response speed is high.

3 Claims, 14 Drawing Figures

METHOD OF DRIVING A LIQUID CRYSTAL DISPLAY APPARATUS

BACKGROUND OF THE INVENTION

This invention relates to a method of driving a liquid crystal display apparatus, in which a pulse voltage is applied between electrodes of the display unit to control the state of display.

In general, a static drive of a liquid crystal display apparatus brings about various advantages as compared with a dynamic drive, for example, there is no problem of crosstalk and a low voltage drive is possible. However, as the number of digits increases, the number of lead wires from the electrodes becomes large, which causes inconvenience in circuit configuration.

SUMMARY OF THE INVENTION

This invention relates to a static driving method for a liquid crystal display apparatus, whereby the number of lead wires can be decreased and the liquid crystal display elements can be displayed with uniform contrast.

The main feature of the present invention resides in the following method of driving a display apparatus. That is, in a display apparatus comprising a control electrode and plural selection electrodes which are opposed to the control electrode through a liquid crystal, in which the display element is composed of the control electrode, liquid crystal and selection electrode, a method of driving the display unit comprising applying a constant period pulse to the control electrode, while applying to the selection electrode a pulse having a different phase from that of the first mentioned pulse, thereby applying a periodic pulse group at a constant voltage between the control electrodeand the selection electrode, and for the display element to be displayed setting the time rate of the total pulse groups applied in one period to one specific value within the operating range of the liquid crystal, while for the display element not be displayed setting the time rate of the total pulse groups applied in one period to one specific value beyond the operating range of the liquid crystal.

It is the first object of the present invention to provide a new method of driving a liquid crystal display unit.

The second object of the present invention is to provide a method of driving a liquid crystal display unit whereby the number of lead wires can be decreased and a display of uniform contrast can be obtained.

The third object of the present invention is to provide a method of driving a liquid crystal display unit whereby the voltage value of the pulse groups applied are made constant and the circuit configuration is simplified.

The fourth object of the present invention is to provide a method of driving a liquid crystal display unit in which the drive is static and the total application time in one period of the voltage applied to the liquid crystal display element to be displayed is made long whereby a low voltage drive can be made and the response speed becomes high.

BRIEF DESCRIPTION OF THE DRAWINGS

The nature of the present invention as well as other objects and advantages thereof will become more apparent from consideration of the following detailed description and the accompanying drawings in which.

DESCRIPTION OF THE PREFERRED EMBODIMENTS

Figure 1:
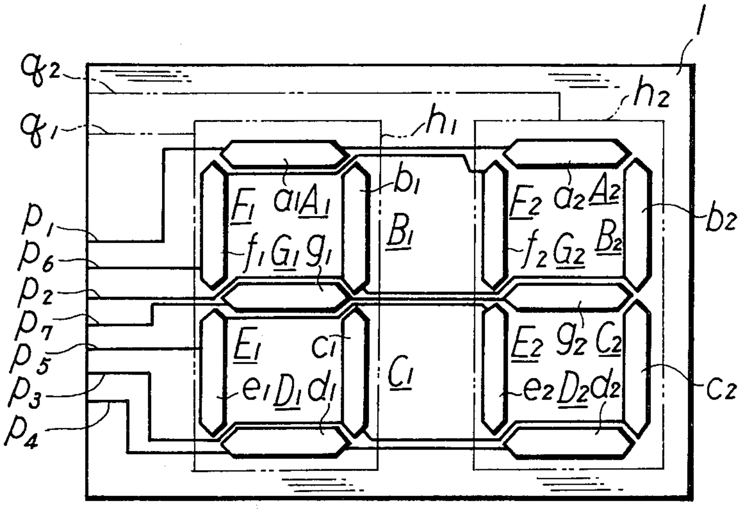
FIG. 1 is an explanatory diagram showing an example of the display unit used in the driving method of the present invention.

An embodiment of the present invention is explained below with reference to the accompanying drawings. FIG. 1 shows an example of a display unit which makes display by the driving method of the present invention. In FIG. 1, selection electrodes $a_1$–$g_1$ and $a_2$–$g_2$ are formed on a glass substrate 1. The selection electrodes $a_1$ and $a_2$, $b_1$ and $b_2$, . . . $g_1$ and $g_2$ are connected to the respective common lead wires $p_1$–$p_7$. On the other hand, control electrodes $h_1$ and $h_2$ are formed on a glass substrate (not shown) which is opposed to the glass substrate 1 through a liquid crystal. The selection electrodes $a_1$–$g_1$ and $a_2$–$g_2$, liquid crystal and the control electrodes $h_1$ and $h_2$ constitute liquid crystal display elements A1–G1 and A2–G2. Lead wires $q_1$ and $q_2$ are led from the control electrodes $h_1$ and $h_2$ respectively.

Figure 2:
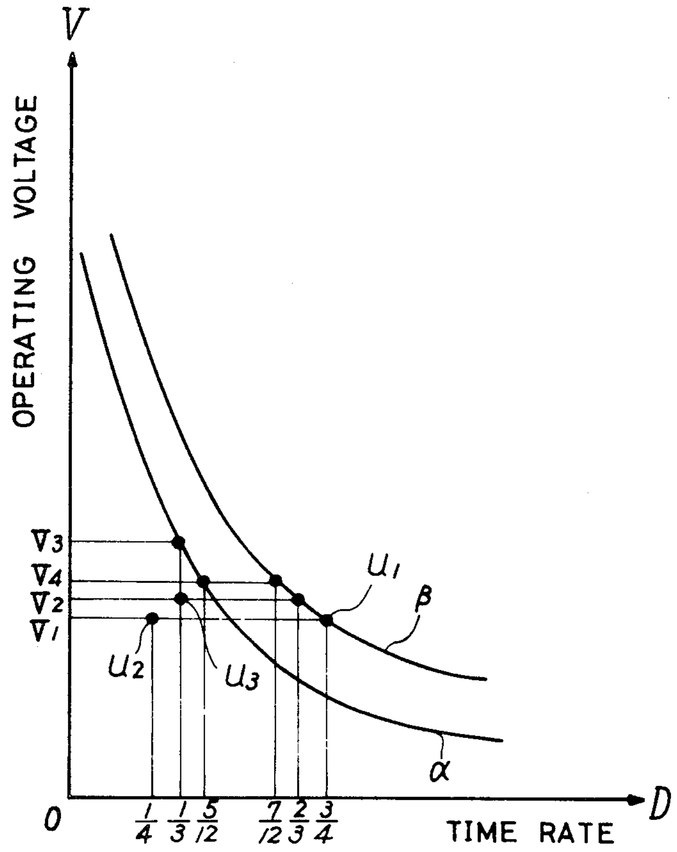
FIG. 2 is a characteristic diagram showing the relationship between the time rate and the critical values in display and non-display conditions, of the voltage applied to the liquid crystal used in this embodiment.
Figure 3:
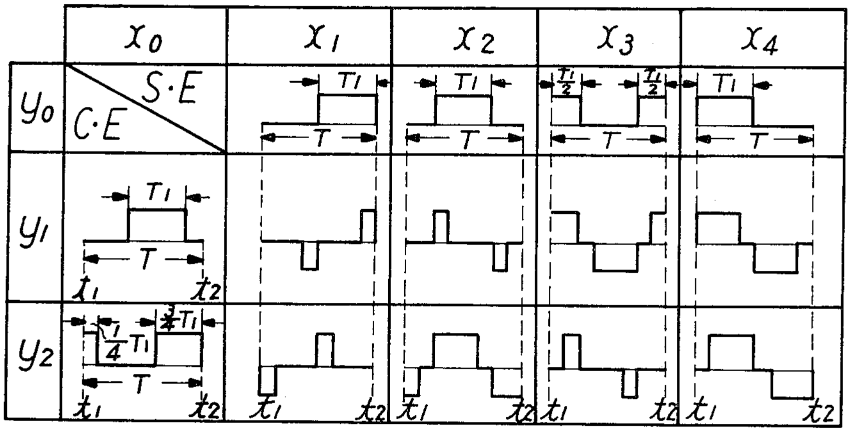
FIG. 3 is a diagram showing the state of the pulses supplied to the electrodes of the display unit of FIG. 1 and that of the voltage applied between both electrodes.

With reference to FIG. 2, an explanation is given below on the state of pulses for bringing the liquid crystal display unit in this embodiment into a display or nondisplay condition. FIG. 2 shows the relation of the operating voltage of the liquid crystal to the time rate D=to/T when changing the total application time "to" of the pulse applied to the liquid crystal within a preset time T. The curve $\alpha$ represents the lower-limit voltage at which the liquid crystal operates and the curve $\beta$ represents the voltage at which the liquid crystal operates completely (hereinafter referred to as the "saturation voltage"). The pulse applied to the liquid crystal for display is taken to be $D=\frac{3}{4}$ and voltage V1 (the point 'U1' on the curve $\beta$ shown) and the pulse for nondisplay is taken to be of $D=\frac{1}{4}$ and voltage V1 (the point 'U2' shown). And, FIG. 3 shows the relationship of pulses applied to each selection and control electrodes for bringing the display unit into a display or non-display condition through application of the above mentioned pulses to the liquid crystal. An explanation is given below on the method of applying pulses for bringing the display elements A1 and A2 shown in FIG. 1 selectively into a display or non-display condition. In FIG. 3, the pulse groups at the element positions ($y_0$, $x_1$), ($y_0$, $x_2$), ($y_0$, $x_3$), and ($y_0$, $x_4$) indicate the timing condition to be supplied to the terminal P1 of the selection electrode shown in FIG. 1 during the time T, in which the total generation time T1 of each pulse group is equal, $T1/T=\frac{1}{2}$. The pulse groups at the element positions ($y_1$, $x_0$) and ($y_2$, $x_0$) indicate the timing condition to be applied to the control electrode $h_1$, or $h_2$, in which the total generation time T1 of each pulse group is equal, $T1/T=\frac{1}{2}$. The pulse groups at the element position ($y_m$, $x_n$), (wherein m=1, 2 and n=1, 2, 3, 4) indicate the pulse groups of the difference between the pulse groups shown at the element position ($y_o$, $x_n$) and those shown at the element position ($y_m$, $x_o$).

Accordingly, by the application of the non-display pulse groups at the element positions ($y_1$, $x_1$), ($y_2$, $x_1$), ($y_1$, $x_2$), and ($y_2$, $x_3$), the display element is brought into a non-display condition, and by the application of the display pulse groups at the element positions ($y_2$, $x_2$), ($y_1$, $x_3$), ($y_1$, $x_4$) and ($y_2$, $x_4$), the display element is displayed.

Figure 4:
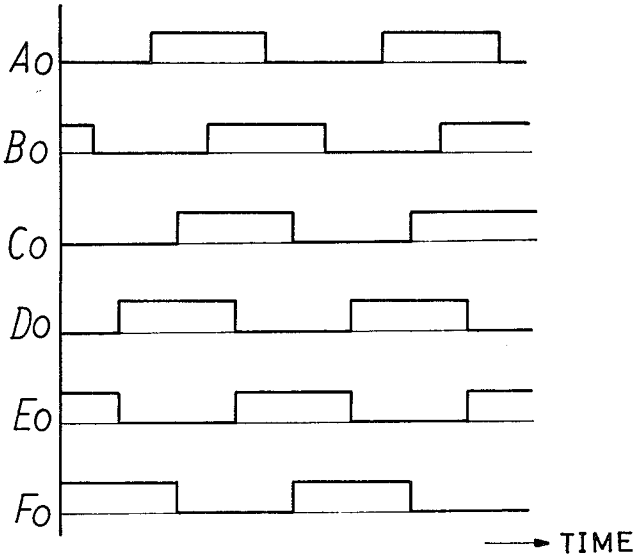
FIGS. 4 and 5 are each a timing chart showing the timing condition of the pulse groups of FIG. 3.

That is, the pulse groups at the element positions ($y_1$, $x_0$) and ($y_2$, $x_0$) are fed to the control electrodes $h_1$ and $h_2$ and, for having both display elements A1 and A2 non-displayed, the pulse groups at the element position ($y_0$, $x_1$) is applied to the selection electrodes and, for having the display elements A1 and A2 non-displayed and displayed respectively, the pulse groups at the element position ($y_0$, $y_2$) is fed. Further, for having the display elements A1 and A2 displayed and non-displayed respectively, the pulse group at the element position ($y_0$, $x_3$) is fed and, for having the display elements A1 and A2 both displayed, the pulse group at the element position ($y_0$, $x_4$) is fed. FIG. 4 is a timing chart for the supply of pulses mentioned above. FIGS. 4A, B, . . . F show the pulse groups at the element positions ($y_1$, $x_0$), ($y_2$, $x_0$), ($y_0$, $x_1$), ($y_0$, $x_2$), ($y_0$, $x_3$) and ($y_0$, $x_4$) respectively. FIGS. 5A, B, . . . H are timing charts of the pulse groups which are applied between both electrodes by the aforementioned application of pulses, that is, the pulse groups at the element positions ($y_1$, $x_1$), ($y_1$, $x_2$), ($y_1$, $x_3$), ($y_1$, $x_4$), ($y_2$, $x_1$), ($y_2$, $x_2$) ($y_2$, $x_3$), and ($y_2$, $x_4$) respectively.

At the element position ($y_m$, $x_n$) (wherein m=1,2 and n=1, 2, 3, 4) in FIG. 3, both positive and negative voltages are generated for the same time within the time T. However, since the liquid crystal does not have a voltage directivity, if both the said positive and negative voltages are considered to be the same, the total application times of the display pulse groups at the element positions ($y_1$, $x_3$), ($y_1$, $x_4$), ($y_2$, $x_2$) and ($y_2$, $x_4$) are all equal and the time rate becomes $\frac{3}{4}$. Further, the total application times of the non-displayed pulse groups at the element positions ($y_1$, $x_1$), ($y_1$, $x_2$), ($y_2$, $x_1$) and ($y_2$, $x_3$) are all equal and the time rate becomes $\frac{1}{4}$ within time T.

Consequently, by the application of the aforementioned pulse groups, the display elements A1 and A2 selectively become displayed and non-displayed and the display is made with uniform contrast.

Also to the other display segments there are applied the same pulse groups in the same manner as above.

Figure 6:
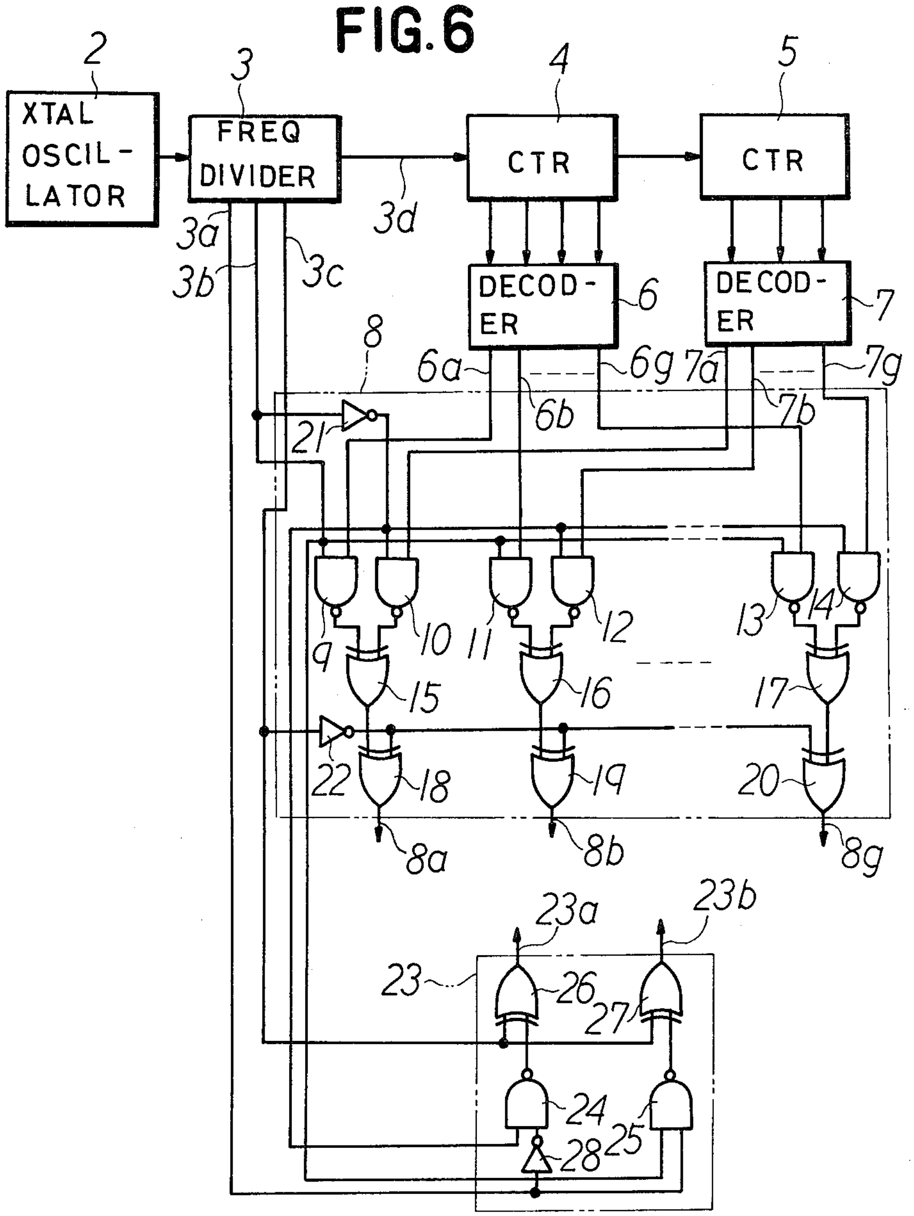
FIG. 6 is an electric circuit diagram exemplifying a driving circuit of the display unit of FIG. 1.
Figure 7:
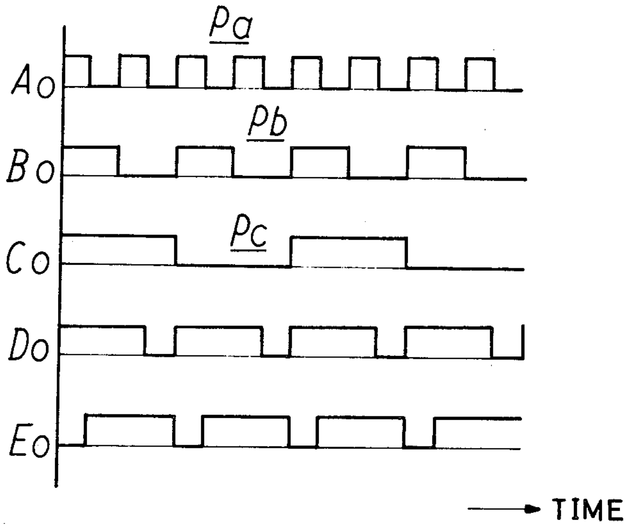
FIG. 7 is a time chart for explaining the operation of FIG. 6.

Next, an example of the circuit for generating the foregoing pulses is explained below. In FIG. 6, a frequency divider 3 lowers the output frequency of a crystal oscillator 2 and generates pulses for an A.C. drive of the liquid crystal in output terminals *3a, 3b* and *3c* in the manner shown in FIGS. 7-A, -B and -C and also generates a pulse with a period of one second in an output terminal *3d.* The pulse of FIG. 7-C is of the same period as the pulse groups of FIGS. 4-A, -B, . . . -F. Decimal and hexa counters 4 and 5 count the places the places 1 and 10 of a second respectively. The contents of such counting are converted be decoders 6 and 7 and outputs for selecting the display elements A1–G1 and A2–G2 of FIG. 1 are generated from the output terminals *6a–6g* and *7a–7g* respectively. The driving circuit 8, the output of which is for driving the selection electrodes, is composed of gate circuits 9–20 and inverters 21 and 22. The pulse groups from output terminals *8a–8g* are fed to the lead wires P1–P7 of FIG. 1 respectively. A driving circuit 23, which is for driving the control electrodes, is composed of gate circuits 24–27 and an inverter 28. The pulse groups from output terminals *23a* and *23b* are fed to the lead wires $q_1$ and $q_2$ of FIG. 1 respectively.

The following description is now provided for the explanation of operation. First, the operation of the driving circuit 23 is explained. To one inputs of the gate circuits 24 and 25 are fed the pulse Pa of FIG. 7-*a* and its inverted pulse respectively, and to the other inputs are fed the pulse Pb of FIG. 7-B and its inverted pulse, so that the pulses of FIGS. 7-D and -E are generated respectively at the outputs of the gate circuits 24 and 25. On the other hand, to one inputs of the gate circuits 26 and 27 is fed the pulse Pc of FIG. 7-C and, according to the logical value of the pulse Pc, the pulses of FIGS. 7-D and -E from the gate circuits 24 and 25 and their level-inverted pulses, that is, the pulses of FIGS. 4-A and -B, are generated at the terminals *23a* and *23b.*

Next, an explanation is given below on the pulse generated at the output of the driving circuit 8, for example, on the pulse generated at the terminal *8a.* To one inputs of the gate circuits 9 and 10 are respectively fed the pulse Pb from the terminal *3b* and its level-inverted pulse, and to the respective other inputs are fed outputs of logical value "1" from the decoders 6 and 7 at the time of selecting the display elements A1 and A2. Therefore, for example, in case the outputs for selecting the display elements A1 and A2 are not fed from the terminals *6a* and *7a,* the outputs of the gate circuits 9 and 10 both become a logical value "1" and the output of the gate circuit 15 is held at a logical value "0," so that from the gate circuit 18 is generated level-inverted pulse of the pulse Pc from the terminal *3c,* that is, the pulse group of FIG. *4c.* If an output selecting the display element A2 is provided from the decoder 7, the same pulse as the pulse Pb is produced from the gate circuit 10 and its level-inverted pulse produced from the gate circuit 15, so that from the gate circuit 18 is generated the pulse group of FIG. 4D. On the other hand, in case an output selecting the display element A2 is not provided from the decoder 7 and instead an output selecting the display element A1 is provided from the decoder 6, the same pulse as the pulse Pb is produced from the gate circuit 15 and the pulse group of FIG. 4E produced from the gate circuit 18. In case selecting outputs are provided from both the decoders 6 and 7, pulses of different levels are produced from the gate circuits 9 and 10 respectively, so that the output from te gate circuit 15 is held at a logical value "1" and the pulse group of FIG. 4F is produced from the gate circuit 18.

Also from the other terminals 8b–8g there are produced the same pulse groups in the same manner as above.

The case of a two-digit display has been explained above. Next, the case of a three-digit display is explained below.

Figure 8:
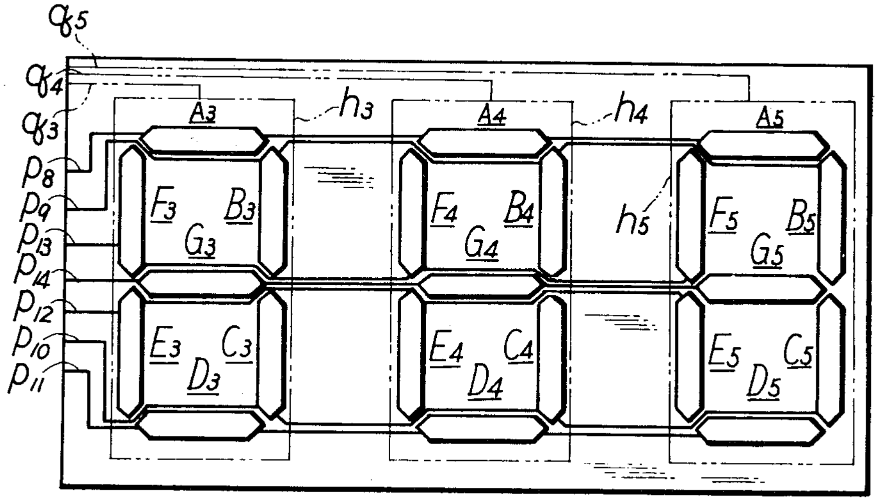
FIG. 8 is an explanatory diagram showing another example of the display unit.

FIG. 8 shows a three-digit display unit of the same construction as in FIG. 1. The display elements A3, A4 and A5, B3, B4 and B5, . . . G1, G2, . . . and G5 are connected to the common lead wires P8–P14 respectively. The reference marks $h_3h_4$ and $h_5$ are control electrodes, and $q_3$, $q_4$ and $q_5$ are lead wires of the said control electrodes respectively.

Figure 9:
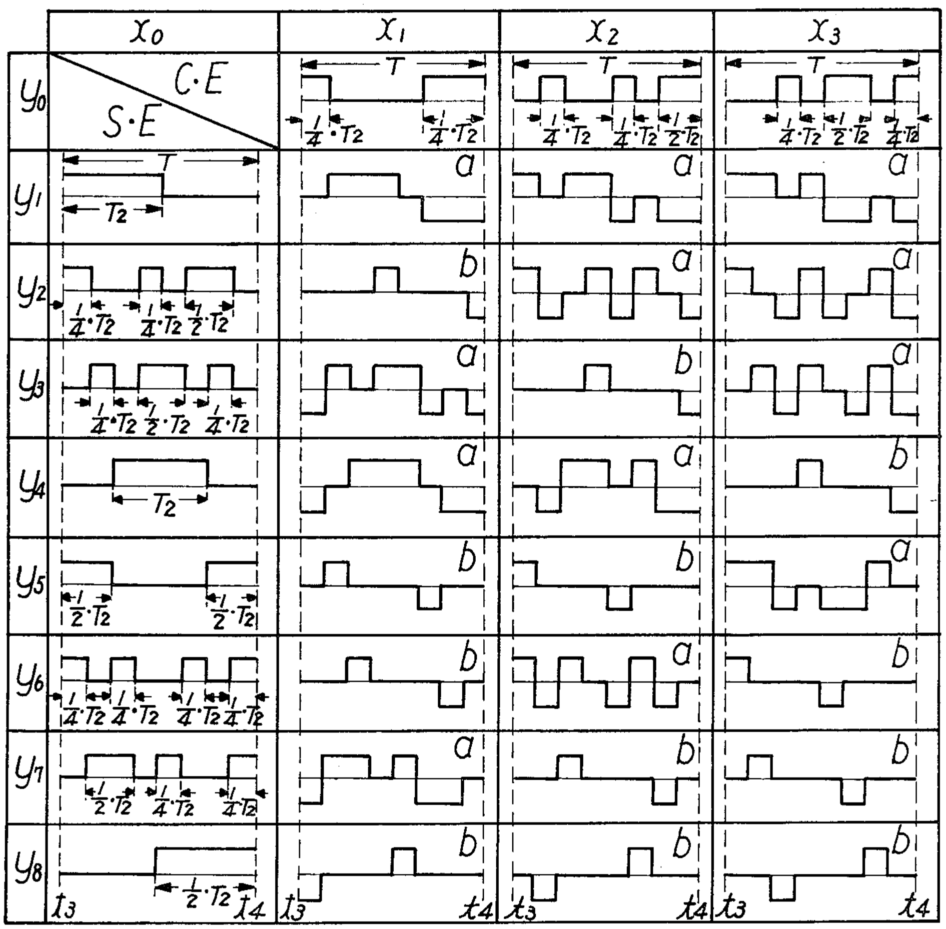
FIG. 9 is a diagram showing the state of the pulse groups supplied to the electrodes of the display unit of FIG. 8 and that of the pulse groups applied between both electrodes.

FIG. 9 shows the state of the pulse groups which are fed to each selection and control electrodes for bringing the display elements of FIG. 8 into display and non-display conditions, and the state of the resulting pulse groups applied between both electrodes.

The method of driving for example the display elements A3, A4 and A5 of FIG. 8 is explained below.

Figure 5:
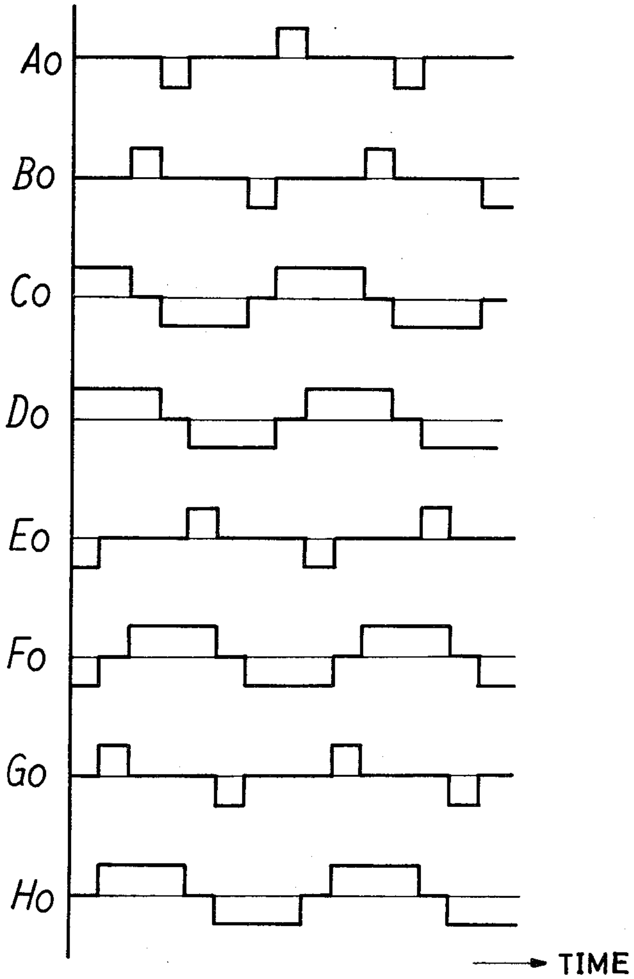

In FIG. 9, the pulse groups shown at the element positions ($y_0$, $x_1$), ($y_0$, $x_2$) and ($y_0$, $x_3$) indicate the timing condition to be fed to the control electrodes $h_3$, $h_4$ and $h_5$ of FIG. 5 during time T, in which the total generation time T2 of each pulse group is equal, $T2/T=\frac{1}{2}$. The pulse groups at the element position ($y_m$, $x_o$) (wherein m=1,2, . . . 8) indicate the timing condition to be fed to the terminal P8 of the selection electrodes of FIG. 8, in which the total generation time T2 of each pulse group is equal, $T2/T=\frac{1}{2}$. The pulse groups at the element position ($y_m$, $x_n$) (wherein m=1,2, . . . 8 and n=1, 2, 3) indicate the pulse groups of the difference between the pulse groups at the element position ($y_m$, $x_o$) and those at the element position ($y_o$, $x_n$).

That is, with the pulse groups at the element positions ($y_0$, $x_1$), ($y_0$, $x_2$) and ($y_0$,, $x_3$) fed to the control electrodes $h_3$, $h_4$ and $h_5$ and by selectively applying the pulse groups at the element position ($y_m$, $x_o$) to the selection electrodes, the display elements A3, A4 and A5 are selectively displayed and non-displayed.

AT the element position ($y_m$, $x_n$), the pulse groups a and b indicate a display pulse group and a non-display pulse group respectively. As in the case of the two digits, if the positive and the negative voltages are considered to be the same, the total application time of each display pulse group shown in the pulse group a is equal and the time rate becomes $\frac{3}{4}$. On the other hand, the toal application time of each non-display pulse group Shown in the pulse group b is equal to the time rate becomes $\frac{1}{4}$. Consequently, like the case of two digits, the display elements are brought into display and non-display conditions by the application of the pulse groups a and b respectively.

Consequently, the display elements A3, A4 and A5 of FIG. 8 each individually can be brought into display and non-display conditions with uniform contrast and thus all combinations of display is made possible.

Figure 10:
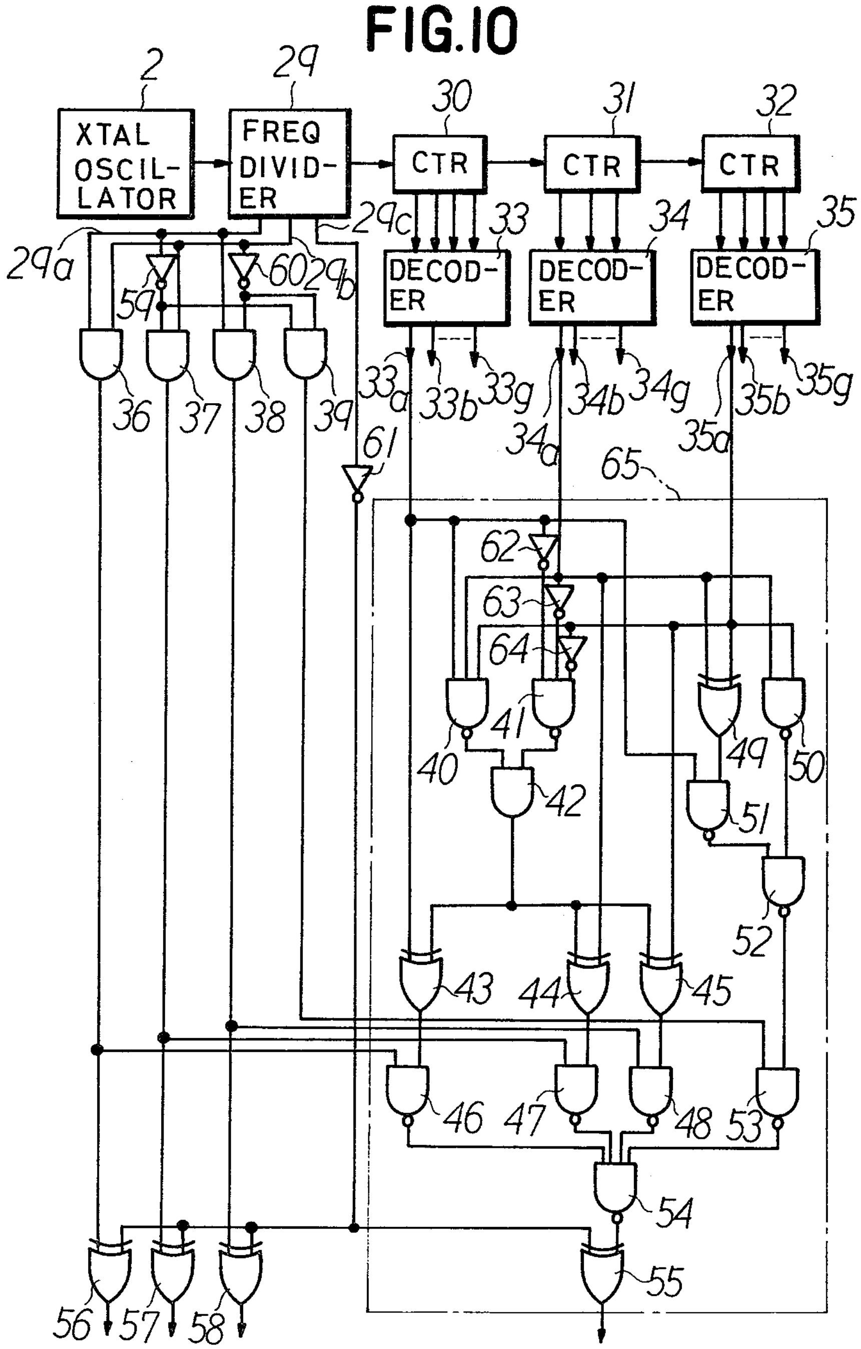
FIG. 10 is an electric circuit diagram showing a part of the driving circuit of the display unit of FIG. 8.

Next, an example of the circuit for generating the aforementioned pulses is explained below. FIG. 10 shows a part of such circuit. In FIG. 10, from output terminals 29a, 29b and 29c of a frequency divider 29 are produced pulses with a duty of 178 and with pulse widths of T2/4, T2/2 and T2 respectively. The reference numbers 30, 31 and 32 are decimal, hexa and decimal counters respectively, and the numerals 33, 34 and 35 are decoders which are the same as the decoders shown in FIG. 6. The numerals 36–58 are gate circuits. The output of the gate circuit 55 is fed to the selection electrodes of the display elements A3, A4 and A5 of FIG. 8. On the other hand, the outputs of the gate circuits 56, 57 and 58 are fed to the control electrodes $h_3$, $h_4$ and $h_5$. The mumerals 59–64 are inverters and numeral 65 is a driving circuit for operating the selection electrodes of the display elements A3, A4 and A5.

The following description is now provided to explain the operation. With the pulses from the terminals 29a and 29b of the frequency divider 29, the timing pulses of FIGS. 11A–11D are produced at the outputs of the gate circuits 36–39 respectively. On the other hand, in the inverter 61 is generated a level-inverted pulse of the pulse from the terminal 29c, so that at the outputs of the gate circuits 56, 57 and 58 are produced the pulse groups at the element positions ($y_0$, $x_1$), ($y_0$, $x_2$) and ($y_0$, $x_3$) of FIG. 9 which are fed to the control electrodes $h_3$, $h_4$ and $h_5$ of FIG. 8 respectively. At the output of the circuit 55 are generated the pulse groups at the element position ($y_m$, $x_o$) (wherein m=1, 2, . . . 8) of FIG. 9 when, with the selecting outputs of the decoders 33, 34 and 35, the logicial values of the terminals 33a, 34a and 35a are (1, 1, 1), (0, 1, 1), (1, 0, 1), (1, 1, 0), (0, 0, 1), (0, 1, 0), (1, 0, 0) and (0, 0, 0) respectively.

Figure 11:
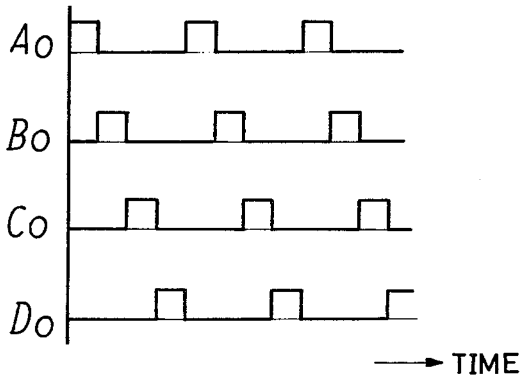
FIG. 11 is a timing chart for explaining the operation of FIG. 10.

Also with respect to the other display elements, the same circuit as the driving circuit 65 for operating the selection electrodes is provided and, with the selecting outputs from the decoders 33, 34 and 35 and the timing pulses of FIG. 11, the same pulse groups as above are generated and thus the other display elements are also brought into display and non-display conditions.

Figure 12:
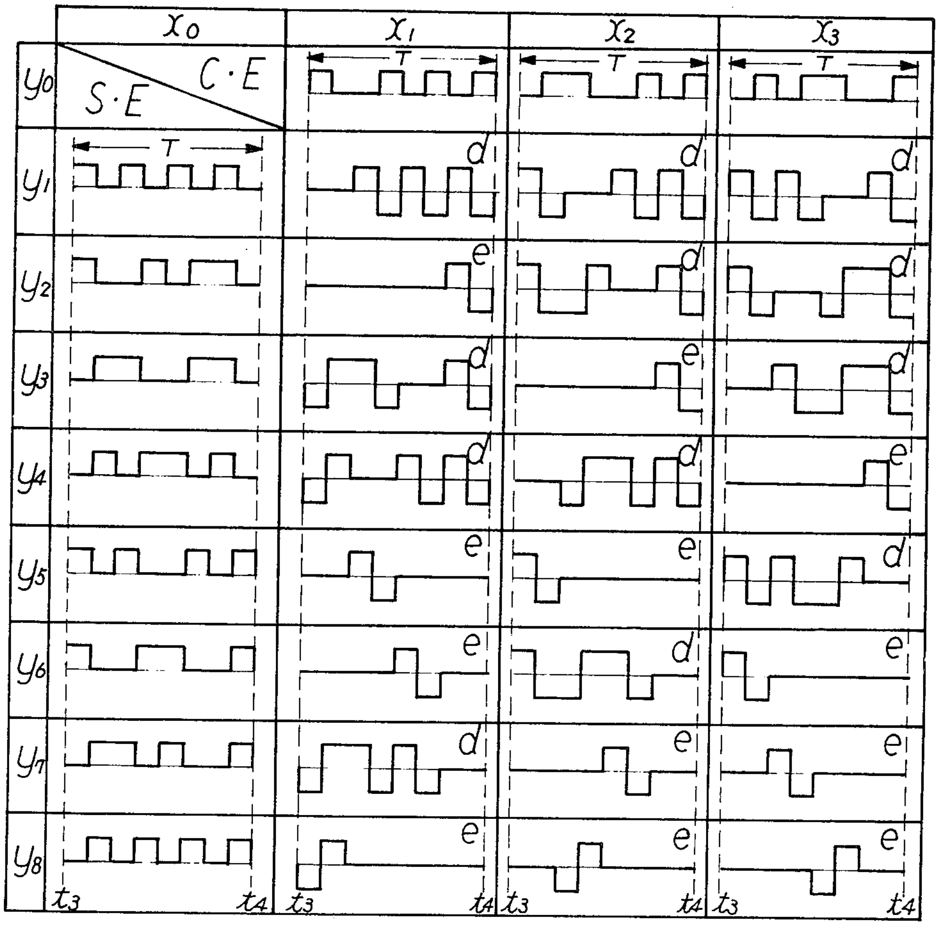
FIG. 12 is a diagram showing the state of the pulse groups supplied to the electrodes of the display unit of FIG. 8 and that of the pulse groups applied between both electrodes.

FIG. 12, shows another example of the application of pulses in the case of displaying three digits.

In FIG. 12, the pulse groups at the element positions ($y_o$, $x_n$), (wherein n=1, 2, 3) and ($y_m$, $x_o$) (wherein m=1, 2, . . . 8) are equal in the total generation time T3, that is, $T3/T=\frac{1}{2}$.

In the element positions ($y_m$, $x_n$) (wherein m=1, 2, . . . 8 and n=1, 2, 3), the pulse group d indicates a display pulse group applied to the display element to be displayed, and the pulse group e indicates a non-display pulse group applied to the display element to be non-displayed. Also in this case, the total application time of the display pulse group d is equal and the time rate becomes $\frac{3}{4}$, and the total application time of the non-display pulse group e is equal and the time rate becomes $\frac{1}{4}$, so that by the application of the pulse groups d and e in the same manner as above, the display elements are brought into display and non-display conditions.

In this case, as the circuit for generating pulses, in place of the output pulse from the inverter 61 which is one input to the gate circuit 55–58 of FIG. 10, a pulse with a period of $\frac{1}{2}$ of the output pulse of the terminal 29a is taken out from the frequency divider 29 and is level inverted, which may be fed to the gate circuits 55–58.

Figure 13A:
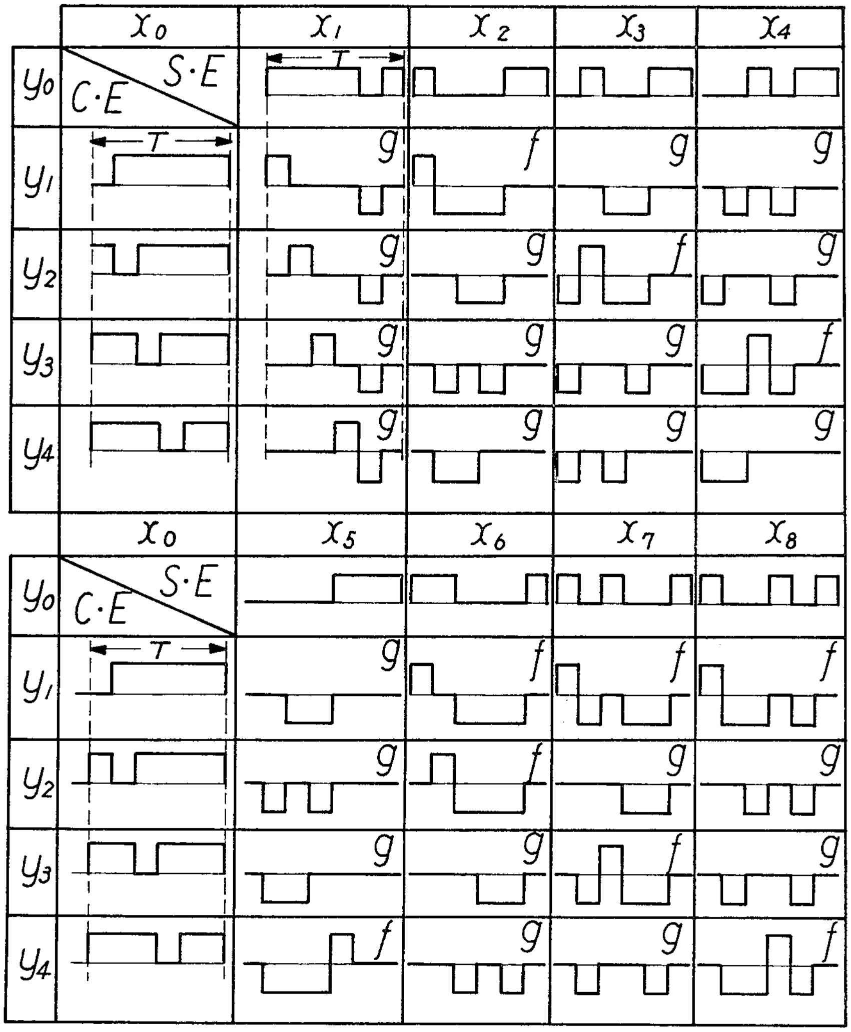
FIGS. 13A and 13B are each a diagram showing the state of the pulse groups supplied to the electrodes of another display unit and that of the pulse groups applied between both electrodes.
Figure 13B:
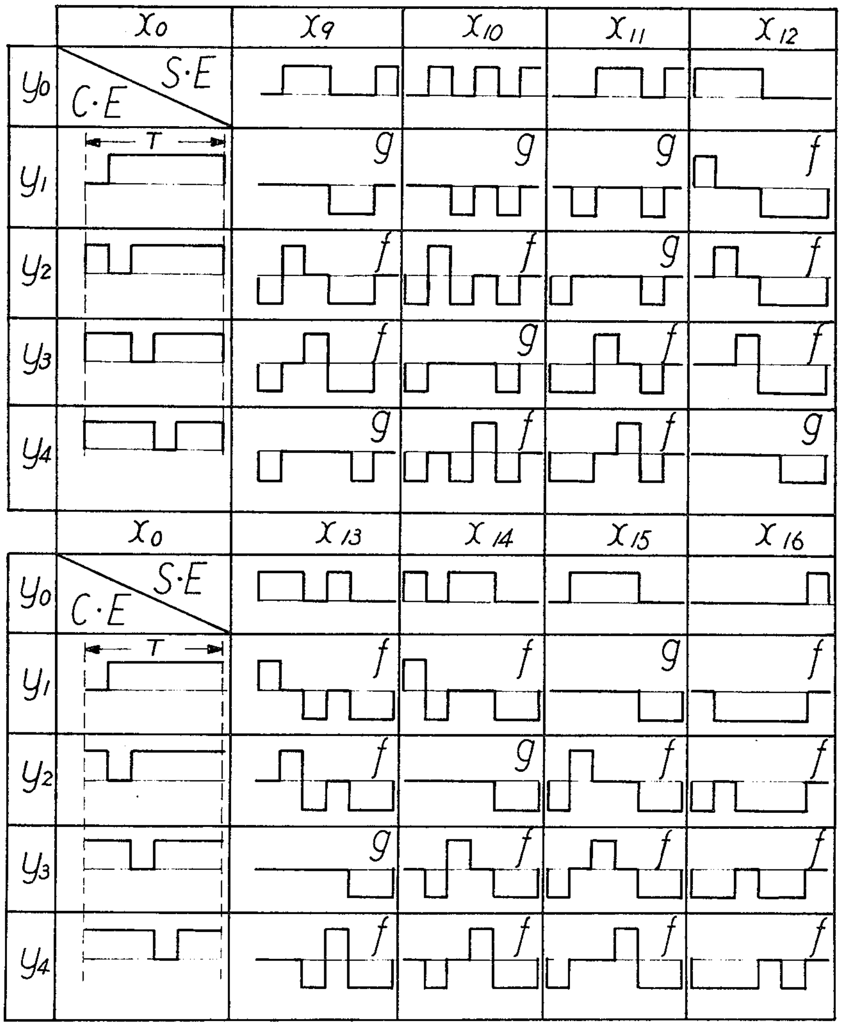

FIGS. 13A and 13B illustrate a four-digit display and show the state of the pulse groups fed to the selection and the control electrodes and that of the pulse groups applied between both electrodes.

In this embodiment, there are fed pulses which have been set so that, in FIG. 2, the display elements are displayed at a time rate $D=\frac{2}{3}$ and a voltage of V2 and are non-displayed at a time rate $D=\frac{1}{3}$ and a voltage of V2 (the point U3 in FIG. 2 is smaller than the critical voltage V3 on the curve $\alpha$).

In FIGS. 13A and 13B, the pulse groups at the element position ($y_o$, $x_n$) (wherein n=2, 3, . . . 15) are all equal in the total generation time T3, that is, T3/T=½. The total generation times T4 and T5 of the pulse groups at the element positions ($y_0$, $x_1$) and ($y_0$, $x_{16}$) are T4/T=5/6 and T5/T=1/6 respectively. On the other hand, the pulse groups at the element position ($y_m$, $x_o$) (wherein m=1,3,4) are all equal in the total generation time T6, that is, T6/T=5/6.

The pulse group f indicates a display pulse group applied to the display element to be displayed and the total application time of each pulse group f is equal and the time rate becomes ⅔. On the other hand, the pulse group g indicates a non-display pulse group applied to the display element to be non-displayed and the total application time of each pulse group g is equal to the time rate becomes ⅓. Consequently, by the application of the pulse groups f and g, the display elements are brought into display and non-display conditions respectively and the display elements of each digits can each individually be displayed and non-displayed with uniform contrast.

The foregoing pulse groups to be fed to the selection electrodes are generated for example in the following manner. In the same manner as in FIG. 10 and with the output from the frequency divider, six kinds of pulses with the same period and a duty of 1/6 are phase-shifted by 1/6 period with each other to form timing pulses, and with these pulses and the decoder output of each digits, the gate circuits are controlled and the foregoing pulse groups produced. On the other hand, the foregoing pulse groups to be fed to the control electrodes are generated by supplying to the gate circuits four kinds of pulses among the six kinds of pulses mentioned above.

In the embodiment of FIGS. 13A and 13B, the application time of the respective positive and negative voltages of the pulse groups applied to the display elements are different. To avoid this, the pulses fed to the selection and the control electrodes are level-inverted at every time T, whereby the polarity of the applied voltage can be reversed at every time T and thus the application time of the positive voltage and that of the negative voltage can be made equal.

In case the number of digits is increased to 5, 6 and 7 digits, timing pulses are produced according to the number of digits and, by using the selecting outputs of each digits, pulses are fed to the selection and the control electrodes, resulting in that with respect to each case, the time rate of the voltage applied between both electrodes becomes two kinds, that is, (⅝, ⅜), (6/10, 4/10) and (7/12, 5/12) respectively.

In the 7-digit case where the two kinds of time rates approaches most closely, the pulses to be fed to the electrodes may be set so that, as in FIG. 2, the display elements are displayed at a time rate D=7/12 and a voltage of V4 and are non-displayed at a time rate D=5/12 and a voltage of V4. Also in this case, display can be made with uniform and satisfactory contrast.

The time rates of the voltage applied between both electrodes according to the number of digit are not limited to those referred to above. In the driving method set forth hereinbefore, however, if the number of digit K is more than 3, a uniform and best contrast can be obtained when the time rate of the display element to be displayed and that of the display element to be non-displayed are K/2(K−1) and K-2/2(K−1) respectively.

In the above embodiments, seven display elements have been used for the display of numerals. However, the method of the present invention is not limited thereto. The selection and the control electrodes may be arranged in the form of a matrix to display numerals or a bar graph. Furthermore, circular electrodes may be divided in the form of three concentric circles to form control electrodes, which may be used for driving a clock wherein the hour, minute and second are displayed with pointer.

According to the present invention, as set forth hereinbefore, the total application time of the pulse group fed to the liquid crystal display element to be displayed and that of the pulse group fed to the liquid crystal display element to be non-displayed are set to specific value within the display and non-display ranges respectively, so that a clear display with uniform contrast can be obtained. Moreover, only a small number of lead wires are needed and so many informations can be displayed. Since the voltage value of the pulse group applied to the display element is constant, the circuit configuration becomes simple. Additionally, since the drive is static and the total application time in one period of the voltage applied to the display element to be displayed is long, a low voltage drive is possible and the response speed becomes high.

What we claim is:

1. A method of applying pulse trains to a plurality of electrodes comprising selection electrodes and control electrodes which are opposed to each other through a liquid crystal, each control electrode being common to a plurality of selection electrodes and each of the selection electrodes and the opposed control electrode with the liquid crysytal interposed therebetween constituting a display unit, said method comprising the following steps:

to each of the control electrodes, applying a pulse train of which the total generation time generated during a cyclical period of time T is constant and the phase relation of pulses measured from a specified time to point is different for different control electrodes;

to the selection electrode of a display unit to be displayed, applying a pulse train having such phase relation to the pulse train applied to the opposed control electrode that the ratio of the total generation time (to) of pulses applied to the liquid crystal interposed between the selection electrode and the control electrode opposed thereto to the cyclical time period T, namely the time ratio (to)/T, is a value needed for allowing the liquid crystal to be active in order to display the display unit;

to the selection electrode of a display unit not be be displayed, applying a pulse train having such phase relation to the pulse train applied to the opposed control electrode that the ratio of the total generation time ($t_1$) of pulses applied to the liquid crystal interposed between the last mentioned selection electrode and the control electrode opposed thereto to the cyclical time period T, namely the time ratio, ($t_1$)/T, is a value below that needed for the liquid crystal to be active in order not to allow the display unit to display.

2. A method of applying pulse trains according to claim 1, wherein when the number of the control electrodes is two, the time ratio to/T equals ¾ and the time ratio $t_1$/T equals ¼.

3. A method of applying pulse trains according to claim 1, wherein the number of the control electrodes K is at least 3 and not more than 7 the ratio to/T equals $$\frac{K}{2(K-1)}$$

and the time ratio $t_1/T$ equals $$\frac{K-2}{2(K-1)}$$

* * * * *